(12) United States Patent
Yang et al.

(10) Patent No.: US 8,064,822 B2
(45) Date of Patent: Nov. 22, 2011

(54) LINK SYNCHRONIZATION METHOD USING RECEIVED POWER IN RF REPEATER

(75) Inventors: Hee-jin Yang, Seoul (KR); Kyoo-tae Ryoo, Seongnam-si (KR); Seong-choon Lee, Seoul (KR); Jeong-hwi Kim, Seoul (KR); Sang-ho Yi, Gwacheon-si (KR)

(73) Assignees: KT Corporation, Jungja-Dong, Bundang-Gu, Kyeonggi-Do, Seongnam (KR); Solid Technologies, Inc., Garakbon-Dong, Songpa-Gu, Seoul (KR)

( * ) Notice: Subject to any disclaimer, the term of this patent is extended or adjusted under 35 U.S.C. 154(b) by 788 days.

(21) Appl. No.: 12/159,127

(22) PCT Filed: Dec. 26, 2005

(86) PCT No.: PCT/KR2005/004536
§ 371 (c)(1),
(2), (4) Date: Jul. 25, 2008

(87) PCT Pub. No.: WO2007/074949
PCT Pub. Date: Jul. 5, 2007

(65) Prior Publication Data
US 2009/0011701 A1    Jan. 8, 2009

(51) Int. Cl.
*H04B 7/14* (2006.01)
(52) U.S. Cl. .......... 455/7; 455/9; 455/11.11; 455/13.1; 455/502; 370/315; 370/332
(58) Field of Classification Search ............ 455/7, 9, 455/11.1, 13.1, 13.2, 13.4, 502, 67.11, 69, 455/522, 115.1, 414.1; 370/332, 326, 318, 315
See application file for complete search history.

(56) References Cited

U.S. PATENT DOCUMENTS

| 6,687,509 B2 | 2/2004 | Schmutz et al. |
| 7,065,060 B2 * | 6/2006 | Yun et al. .................. 370/318 |
| 2004/0125795 A1 * | 7/2004 | Corson et al. ............. 370/356 |
| 2004/0157550 A1 | 8/2004 | Nakagawa |
| 2005/0169295 A1 * | 8/2005 | Yun et al. .................. 370/437 |
| 2006/0072505 A1 * | 4/2006 | Carrillo et al. ............. 370/331 |

FOREIGN PATENT DOCUMENTS

| KR | 10-2004-0090793 | 10/2004 |
| KR | 10-2005-0107044 | 11/2005 |

* cited by examiner

*Primary Examiner* — Tan Trinh
(74) *Attorney, Agent, or Firm* — Lexyoume IP Group, PLLC.

(57) ABSTRACT

Provided is a link synchronization method for a radio frequency repeater that can perform link route switching at an accurate time point by measuring reception signal power at a predetermined period for a predetermined time duration, accumulating and comparing them with a reference level, and detecting a link termination time point. The method includes: a) setting up an initial link route; b) measuring received signal power in the initial link route; c) accumulating the reception signal power received for a predetermined time at a predetermined period, when the reception signal power is detected; d) setting up a reference level for link switching based on the accumulated reception signal power; e) detecting a link termination time point by finding an edge in a waveform of the accumulated reception signal power based on the reference level; and f) switching the current link route based on the detected link termination time point.

9 Claims, 6 Drawing Sheets

FIG. 5
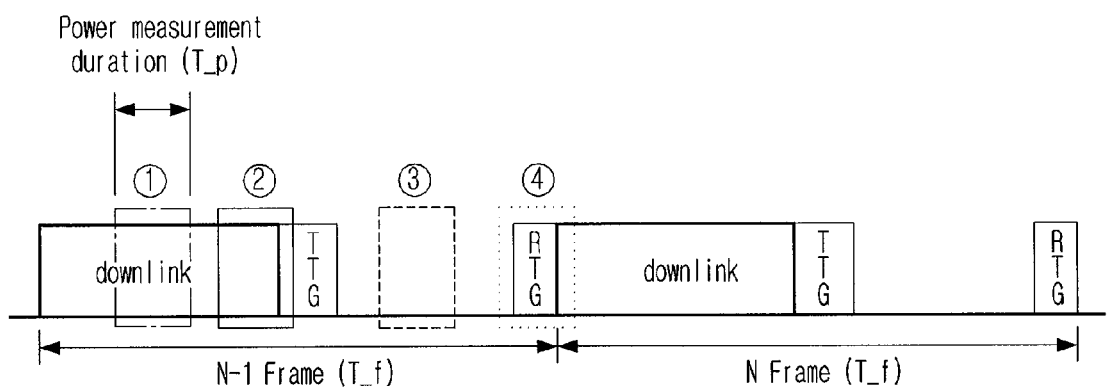
(a)
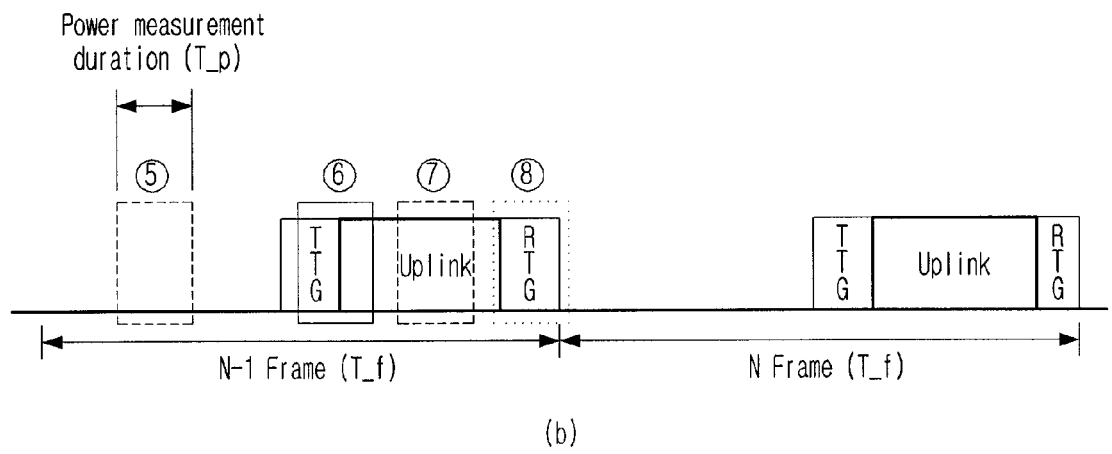
(b)

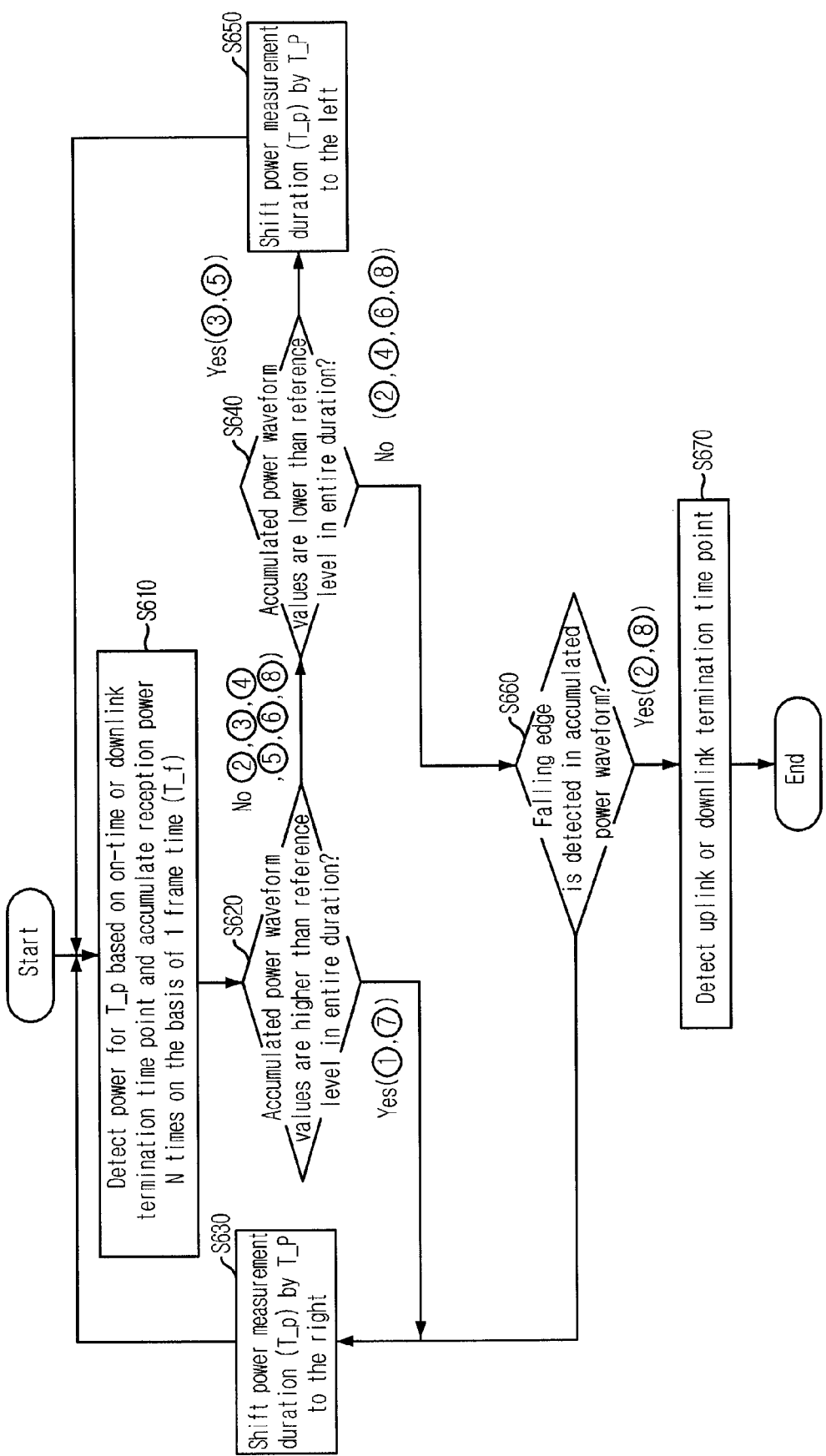

LINK SYNCHRONIZATION METHOD USING RECEIVED POWER IN RF REPEATER

TECHNICAL FIELD

The present invention relates to a link synchronization method for a radio frequency (RF) repeater; and, more particularly, to a link synchronization method using reception signal power in an RF repeater adopting Time Division Duplexing (TDD) method.

BACKGROUND ART

Recent wireless communication systems can wirelessly transmit/receive data in a wireless terminal at a high data transmission rate, while the wireless terminal is in motion. The wireless communication systems use repeaters to connect wireless terminals in shade regions to base stations.

The wireless communication systems use the same frequency band in a forward channel (from a base station to a wireless terminal) and a reverse channel (from a wireless terminal and a base station). The wireless communication systems use a Time Division Duplexing (TDD) method that distributes the forward and reverse channels according to time. Therefore, repeaters should perform link route switching at an exact time point.

In general, frames are synchronized in an Orthogonal Frequency Division Multiple access (OFDMA) system by using a method using correlation in a cyclic prefix (CP) duration, a method using correlation in a preamble duration, or a pilot pattern detecting method.

All the methods can be used to synchronize the link routes of TDD repeaters. However, when the pilot pattern detecting method is used, the TDD repeaters require a demodulator. Since the use of a demodulator adds up to complexity and costs of the wireless communication system systems, it is not efficient to use the pilot pattern detecting method. Therefore, the methods using a CP duration and a preamble duration may be used.

When the method using a CP duration or a preamble duration is used to synchronize the link routes of the TDD repeaters, the level of correlation values may fluctuate deeply due to the characteristics of a wireless channel. Therefore, there is a problem that signal processing should be performed additionally to keep the correlation value at a uniform level.

Also, when the method using a CP duration or a preamble duration is used to synchronize the link routes of the TDD repeaters, the starting and termination time points of a downlink may be known accurately. However, since an uplink termination time point is obtained from calculation based on a ratio of TTG to the downlink, there is a problem that a switching time offset may occur unintentionally when an RF repeater switches its link route into a downlink.

DISCLOSURE

Technical Problem

It is, therefore, an object of the present invention to provide a link synchronization method for a radio frequency (RF) repeater that can perform link route switching at an accurate time point by measuring reception signal power at a predetermined period for a predetermined time duration, accumulating the measurement results, comparing them with a reference level, and detecting a link termination time point.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

Technical Solution

In accordance with one aspect of the present invention, there is provided a link synchronization method for a radio frequency (RF) repeater, which includes the steps of: a) setting up an initial link route; b) measuring power of a received signal in the initial link route; c) accumulating the reception signal power received for a predetermined time at a predetermined period, when the reception signal power is detected; d) setting up a reference level for link switching based on the accumulated reception signal power; e) detecting a link termination time point by finding an edge in a waveform of the accumulated reception signal power based on the reference level; and f) switching the current link route based on the detected link termination time point.

In accordance with one aspect of the present invention, there is provided a computer-readable recording medium for storing a program in a repeater with a processor that implements a method, which includes the steps of: a) setting up an initial link route; b) measuring power of a received signal in the initial link route; c) accumulating the reception signal power received for a predetermined time at a predetermined period, when the reception signal power is detected; d) setting up a reference level for link switching based on the accumulated reception signal power; e) detecting a link termination time point by finding an edge in a waveform of the accumulated reception signal power based on the reference level; and f) switching the current link route based on the detected link termination time point.

ADVANTAGEOUS EFFECTS

As described above, the present invention can transmit data smoothly and reliably by switching a Time Division Duplexing (TDD) repeater between uplink and downlink accurately.

Also, since reception signal power is measured and accumulated to synchronize link routes only for a predetermined time duration according to the present invention, the process of measuring and accumulating the reception signal power is not performed for all frames.

DESCRIPTION OF DRAWINGS

The above and other objects and features of the present invention will become apparent from the following description of the preferred embodiments given in conjunction with the accompanying drawings, in which:

FIG. 5 illustrates power durations where reception signal power can be measured in the uplink and downlink in accordance with an embodiment of the present invention; and FIG. 6 is a flowchart describing a method of detecting a link termination time point in accordance with an embodiment of the present invention.

BEST MODE FOR THE INVENTION

Other objects and aspects of the invention will become apparent from the following description of the embodiments with reference to the accompanying drawings, which is set forth hereinafter. Accordingly, those skilled in the art to which the present invention pertains can easily implement the technological concept of the present invention. Also, when it is considered that detailed description on a related art may obscure the points of the present invention, the description will not be provided herein. Hereinafter, specific embodiments of the present invention will be described in detail with reference to the accompanying drawings.

Figure 1:
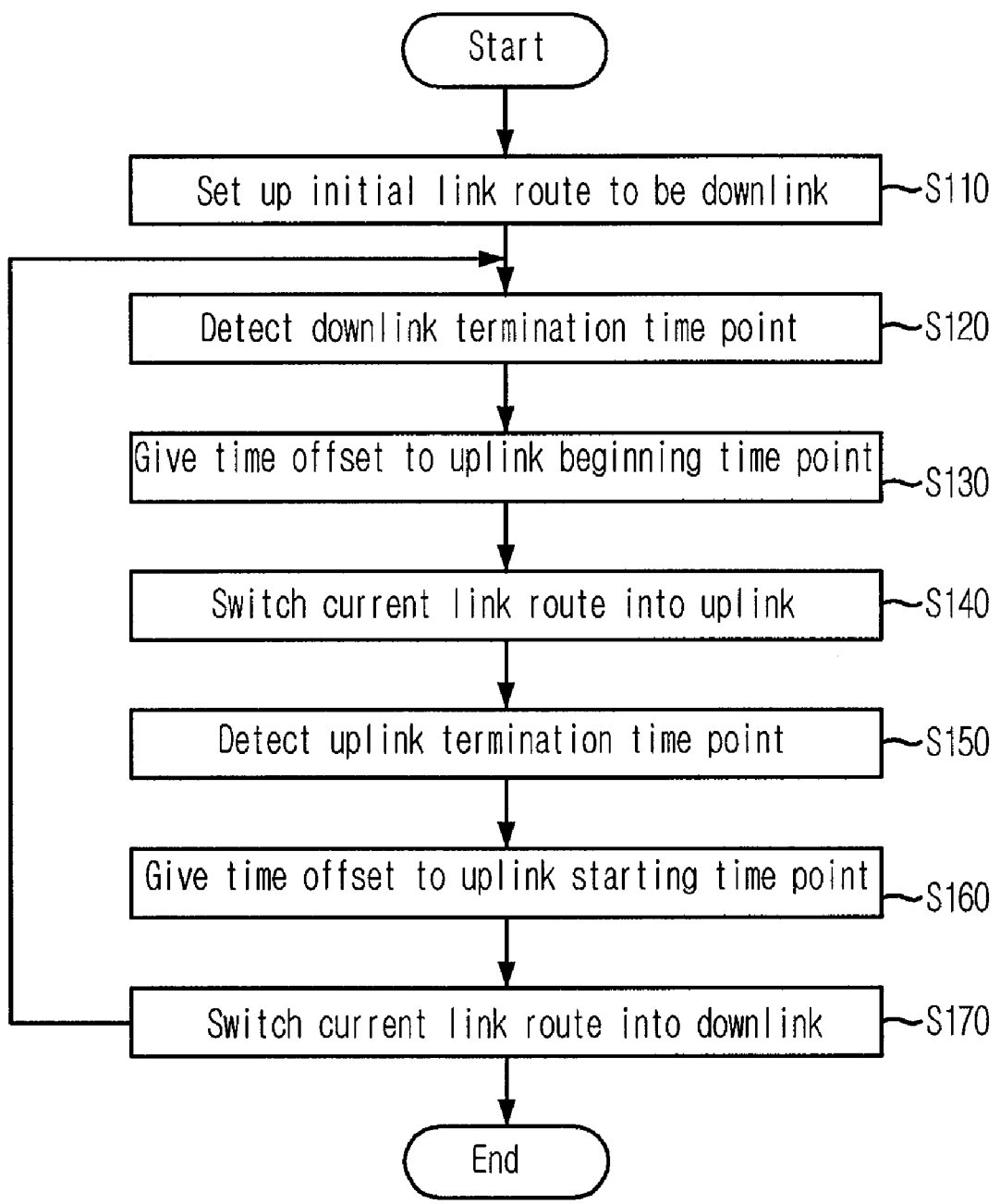
FIG. 1 is a flowchart describing a link route synchronization method based on reception signal power in accordance with an embodiment of the present invention.

FIG. 1 is a flowchart describing a link route synchronization method based on reception signal power in accordance with an embodiment of the present invention.

As illustrated, at step S110, a repeater sets up the initial link route to be downlink (D/L).

At step S120, a downlink termination time point is detected based on reception signal power, and time offset may be given before the link route is changed at step S130 depending on cases.

Subsequently, the repeater switches the route from downlink, which is initially set up, to uplink at step S140 in consideration of guide interval, and it detects an uplink termination time point at step S150 in the same method as the downlink termination time point is detected.

Also, at step S130, time offset may be given before the link route is changed, depending on cases, to delay the time when the route is switched from uplink to downlink.

The above process is repeated until the power source of the repeater is turned off.

Meanwhile, a threshold level for detecting the uplink/downlink termination time point should be set up first to apply the link route synchronization method based on reception signal power.

In short, when the repeater detects a reception signal power, although a base station and a repeater is in a line of sight, an envelope of received signal power may fluctuate deeply due to the effect of path loss and rician/rayleigh according to distance. Thus, a predetermined reference level should be set up to detect the uplink/downlink termination time point from the measurement of reception signal power.

Figure 2:
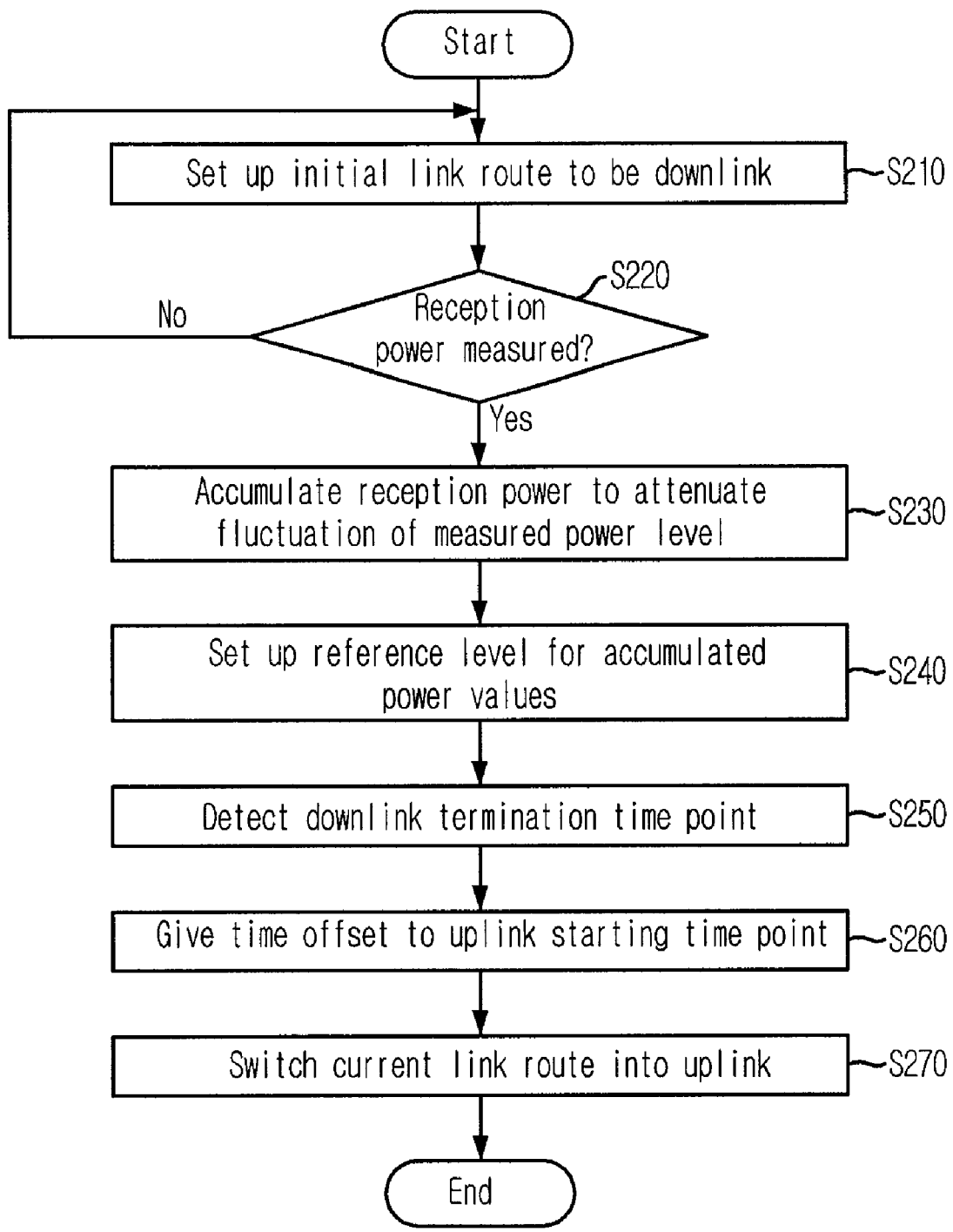
FIG. 2 is a flowchart describing a method of switching a link route from downlink to uplink in accordance with an embodiment of the present invention.
Figure 3:
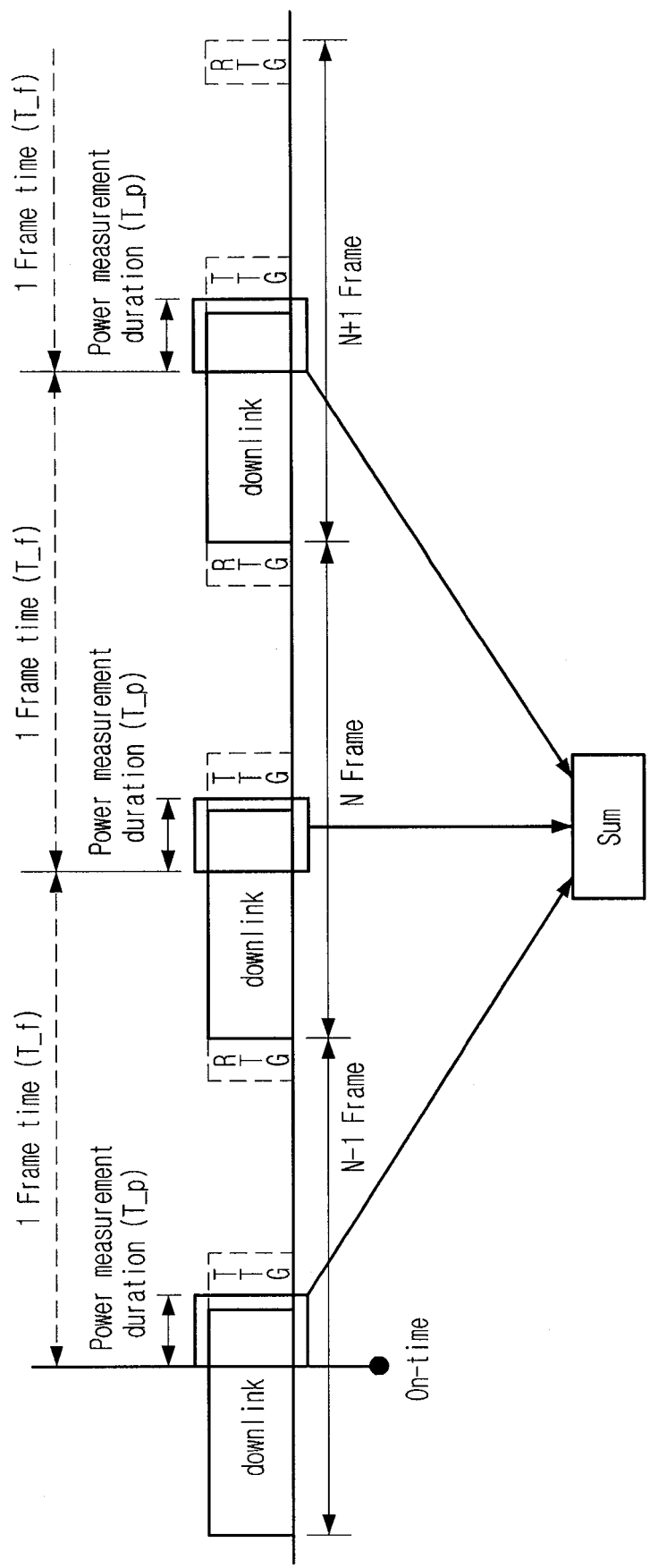
FIG. 3 illustrates accumulation operation of reception signal power in accordance with an embodiment of the present invention.

FIG. 2 is a flowchart describing a method of switching a link route from downlink to uplink in accordance with an embodiment of the present invention, and FIG. 3 illustrates accumulation operation of reception signal power in accordance with an embodiment of the present invention.

Referring to FIG. 2, a repeater sets up the initial link route to be downlink at step S210, and measures reception signal power of the downlink at step S220. Herein, at the step S210, the state may not be the setup of an initial link route but it may be link switching such as a switching from uplink to downlink.

When reception signal power is not detected in the downlink, that is, what the base station is inactivated, the initial link route is maintained.

When reception signal power is detected in the downlink, that is, what the base station is activated, the power received for a predetermined power measurement duration (T_p) is accumulated on the basis of one frame time (T_f) to attenuate fluctuation of the detected reception signal power level at step S230, which is illustrated in FIG. 3. Herein, the reception signal power is detected only in a predetermined time duration based on the on-time of the repeater to reduce the change in the envelope caused by the characteristics of a wireless channel, when the reception signal power is detected.

Subsequently, at step S240, a reference level is set up for the accumulated reception signal power values. At step S250, a downlink termination time point is detected based on the reference level. Depending on cases, time offset may be given to a link route change to thereby delay the switching time from the downlink to uplink at step S260.

Finally, at step S270, the route is switched from the downlink to uplink in consideration of guide interval.

Figure 4:
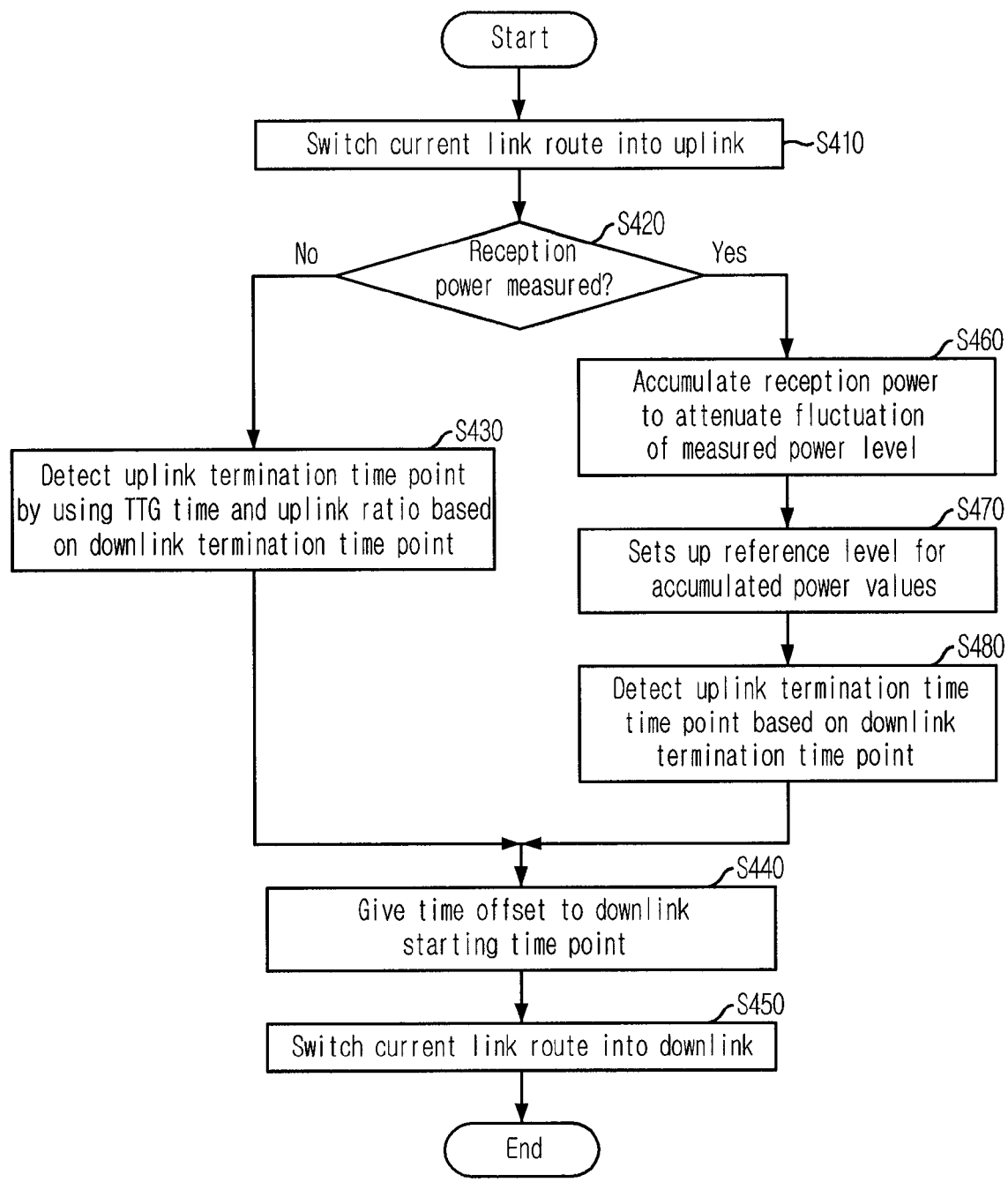
FIG. 4 is a flowchart describing a method of switching a link route from uplink to downlink in accordance with an embodiment of the present invention.

FIG. 4 is a flowchart describing a method of switching a link route from uplink to downlink in accordance with an embodiment of the present invention.

Referring to FIG. 4, when the repeater switches its link route from downlink to uplink at step S410, and measures the reception signal power at step S420.

When the reception signal power is not detected, that is, when the wireless terminal does not exist in a service coverage, an uplink termination time point is detected at step S430 based on a guide interval TTG and a fixed uplink ratio. Herein, the uplink/downlink ratio and the guide interval ratio are predetermined.

At step S440, time offset is given for the change of the link route and the switching time from uplink to downlink is delayed.

Subsequently, the link route is switched from uplink to downlink at step S450.

When reception signal power is detected, that is, when there is a wireless terminal within a service coverage, the reception signal power is accumulated for a predetermined power measurement duration (T_p) on the basis of one frame time (T_f) to set up a reference level for switching the link route at step S460. Herein, the reception signal power is detected for a predetermined time duration based on the on-time of the repeater to reduce the fluctuation of an envelope caused by the characteristics of a wireless channel, when the reception signal power is detected.

At step S470, the reference level is set up for the accumulated reception signal power values.

Subsequently, the uplink termination time point is detected based on the reference level and the downlink termination time point at step S480. Depending on cases, time offset may be given before the link route is changed to thereby delay the switching time from uplink to downlink at step S440).

Finally, the link route is switched from uplink to downlink at step S450.

FIG. 5 illustrates durations where reception signal power can be measured in the uplink and downlink in accordance with an embodiment of the present invention, and FIG. 6 is a flowchart describing a method of detecting a link termination time point in accordance with an embodiment of the present invention.

FIG. 5(a) shows durations for measuring power in the downlink at a repeater when the base station is activated. Reference numeral ① denotes a case where the accumulated waveform values are higher than the reference level in the entire duration. Reference numerals ②, ③ and ④ denote cases where the accumulated waveform values are not higher than the reference level in the entire duration.

FIG. 5 (b) shows durations for measuring power in the uplink at a repeater when there is a wireless terminal within a service coverage of the repeater. Reference numeral ⑦ denotes a case where the accumulated waveform values are higher than the reference level in the entire duration. Reference numerals ⑤, ⑥ and ⑧ denote cases where the accumulated waveform values are not higher than the reference level in the entire duration.

Referring to FIG. 6, reception signal power is accumulated N times for a predetermined power measurement duration (T_p) on the basis of one frame time (T_f) based on the on-time of the repeater or a downlink termination time point to detect a link termination time point at step S610.

It is determined at step S620 that the accumulated power waveform values are higher than the reference level in the entire duration.

When the accumulated power waveform values are higher than the reference level in the entire duration, i.e., the cases of the reference numerals ① and ⑦ of FIG. 5, the power measurement duration is shifted to the right at step S630. Reception signal power is accumulated again there at the step S610 and it is determined at step S620 that the accumulated power waveform values are higher than the reference level in the entire duration.

When the accumulated power waveform values are lower than the reference level in the entire duration, i.e., the cases of the reference numerals ②, ③, ④, ⑤, ⑥ and ⑧ of FIG. 5, it is determined at step S640 that the accumulated power waveform values are lower than the reference level in the entire duration.

When the accumulated power waveform values are lower than the reference level in the entire duration, i.e., the cases of the reference numerals ③ and ⑤, the power measurement duration is shifted to the left at step S650 and the logic flow repeats from the step S610.

Meanwhile, when the accumulated power waveform values are not lower than the reference level in the entire duration and they are lower than the reference level only in some part of the duration, i.e., the cases of ②, ③, ④ and ⑧ of FIG. 5, it is determined at step S660 that it is possible to detect a falling edge of the accumulated power waveform.

When the falling edge of the accumulated power waveform is not detected, i.e., the cases of ④ and ⑥ of FIG. 5, the power measurement duration is shifted to the right and the logic flow repeats from the step S610.

When the falling edge of the accumulated power waveform is detected, i.e., the cases of ② and ⑧ of FIG. 5, the uplink/downlink termination time point is detected at step S670.

As described above, although the present invention has been described by setting up the initial link route to be downlink in the above embodiments, when the repeater is on-time, it is obvious to those skilled in the art of the present invention that the link synchronization method may be realized by setting up the initial link route to be uplink, too.

The method of the present invention can be realized as a program and stored in computer-readable recording media, such as CD-ROM, RAM, ROM, floppy disks, hard disks, magneto-optical disks and the like. Since the process can be easily implemented by those of ordinary skill in the art of the present invention, description on it will not be provided herein.

While the present invention has been described with respect to certain preferred embodiments, it will be apparent to those skilled in the art that various changes and modifications may be made without departing from the scope of the invention as defined in the following claims.

What is claimed is:

1. A link synchronization method for a radio frequency (RF) repeater, comprising:
   a) setting up an initial link route;
   b) measuring power of a received signal in the initial link route;
   c) accumulating the reception signal power received for a predetermined time at a predetermined period, when the reception signal power is detected;
   d) setting up a reference level for link switching based on the accumulated reception signal power;
   e) detecting a link termination time point by finding an edge in a waveform of the accumulated reception signal power based on the reference level; and
   f) switching the current link route based on the detected link termination time point.

2. The method as recited in claim 1, further comprising the step of:
   g) maintaining the initial link route, when the reception signal power,
   wherein the initial link route is downlink.

3. The method as recited in claim 1, further comprising the steps of:
   h) measuring reception signal power of the switched uplink;
   i) accumulating reception signal power for a predetermined time at a predetermined period, when reception signal power is detected in the uplink reception signal power measurement step h);
   j) setting up a second reference level for switching the link route based on the accumulated reception signal power;
   k) detecting an uplink termination time point by finding an edge of a waveform of the accumulated reception signal power based on the second reference level and the downlink termination time point; and
   l) secondarily switching the current link route based on the detected uplink termination time point.

4. The method as recited in claim 3, further comprising the step of:
   m) calculating an uplink termination time point by using an uplink route ratio and a guide interval predetermined based on a downlink termination time point, when reception signal power is not detected in the uplink reception signal power measurement step h).

5. The method as recited in claim 4, wherein reception signal power is accumulated for a predetermined time at a predetermined period based on on-time and a reception signal power detection time point is shifted based on the reference level, until a falling edge is detected in a waveform of the accumulated reception signal power in the link termination time point detection step m).

6. The method as recited in claim 1, further comprising the step of:
   n) adding time offset before a link route is switched.

7. The computer-readable recording medium as recited in claim 1, further comprising the steps of:
   g) maintaining the initial link route, when the reception signal power,
   wherein the initial link route is downlink.

8. The computer-readable recording medium as recited in claim 7, further comprising the steps of:
   h) measuring reception signal power of the switched uplink;
   i) accumulating reception signal power for a predetermined time at a predetermined period, when reception signal power is detected in the uplink reception signal power measurement step h);
   j) setting up a second reference level for switching the link route based on the accumulated reception signal power;
   k) detecting an uplink termination time point by finding an edge of a waveform of the accumulated reception signal power based on the second reference level and the downlink termination time point; and l) secondarily switching the current link route based on the detected uplink termination time point.

9. A computer-readable recording medium for storing a program in a repeater with a processor that implements a method, comprising the steps of:

a) setting up an initial link route;

b) measuring power of a received signal in the initial link route;

c) accumulating the reception signal power received for a predetermined time at a predetermined period, when the reception signal power is detected;

d) setting up a reference level for link switching based on the accumulated reception signal power;

e) detecting a link termination time point by finding an edge in a waveform of the accumulated reception signal power based on the reference level; and f) switching the current link route based on the detected link termination time point.

* * * * *